(12) United States Patent
Takada

(10) Patent No.: US 8,539,676 B2
(45) Date of Patent: Sep. 24, 2013

(54) ROLLING BEARING SYSTEM FOR VEHICLES

(75) Inventor: Yoshito Takada, Nara (JP)

(73) Assignee: JTEKT Corporation, Osaka (JP)

( * ) Notice: Subject to any disclaimer, the term of this patent is extended or adjusted under 35 U.S.C. 154(b) by 405 days.

(21) Appl. No.: 12/832,842

(22) Filed: Jul. 8, 2010

(65) Prior Publication Data
US 2010/0269347 A1 Oct. 28, 2010

Related U.S. Application Data

(62) Division of application No. 11/653,289, filed on Jan. 16, 2007, now abandoned.

(30) Foreign Application Priority Data

Jan. 20, 2006 (JP) ................................. 2006-012185

(51) Int. Cl.
*F16C 19/18* (2006.01)
*F16C 41/00* (2006.01)

(52) U.S. Cl.
USPC ...................... 29/898.04; 29/898.06; 384/544

(58) Field of Classification Search
USPC .................... 29/898, 898.04, 898.06, 898.07, 29/898.09; 384/448, 544
See application file for complete search history.

(56) References Cited

U.S. PATENT DOCUMENTS

| 2,449,946 | A | | 9/1948 | Martin et al. |
| 3,119,941 | A | | 1/1964 | Guiot |
| 4,060,845 | A | * | 11/1977 | Bowers et al. ................ 361/149 |
| 5,670,874 | A | | 9/1997 | Miyazaki et al. |
| 6,217,220 | B1 | * | 4/2001 | Ohkuma et al. .............. 384/489 |
| 6,692,153 | B2 | | 2/2004 | Ohtsuki et al. |
| 6,997,615 | B2 | | 2/2006 | Takada et al. |
| 2004/0170345 | A1 | * | 9/2004 | Takada .......................... 384/448 |

FOREIGN PATENT DOCUMENTS

| EP | 1 431 071 A2 | 6/2004 |
| EP | 1 457 719 A1 | 9/2004 |
| JP | 2004-198378 A | 7/2004 |
| JP | 2005-088817 A | 4/2005 |
| JP | 2005-227296 A | 8/2005 |
| JP | 2005-280567 A | 10/2005 |
| JP | 2006-214895 A | 8/2006 |
| WO | WO 2004113751 A1 * | 12/2004 |

OTHER PUBLICATIONS

English translation of WO 2004113751 A1 acquired from Espacenet on Jul. 17, 2012.*

* cited by examiner

*Primary Examiner* — David Bryant
*Assistant Examiner* — Jason L Vaughan
(74) *Attorney, Agent, or Firm* — Birch, Stewart, Kolasch & Birch, LLP

(57) ABSTRACT

The present invention provides a rolling bearing device for vehicles capable of detecting a change in magnetism with high accuracy. A rolling bearing device H for vehicles in accordance with the present invention includes a rolling bearing 13 having an inner ring 11, which is a rotating ring, and an outer ring 12, which is a fixed ring, and rolling elements 3 and 4 interposed between both of the races 11 and 12; a magnetized element 14; a magnetic sensor 15; and a cover 16. The cover 16 is formed by demagnetizing a nonmagnetic material having being pressed.

11 Claims, 1 Drawing Sheet

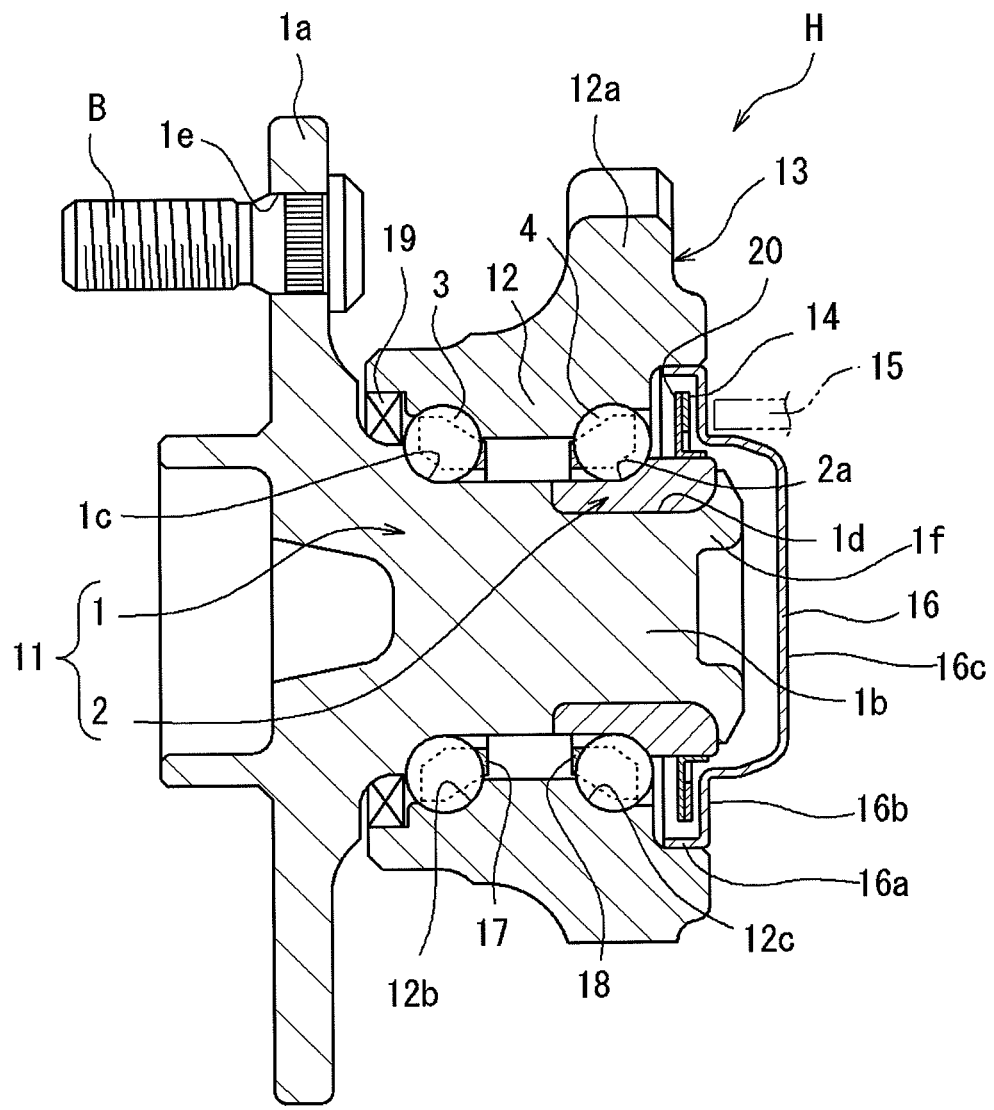

ROLLING BEARING SYSTEM FOR VEHICLES

This application is a Divisional of U.S. application Ser. No. 11/653,289 filed Jan. 16, 2007 now abandoned, which priority is claimed under 35 U.S.C. §120. Application Ser. No. 11/653,289 claims priority to Application No. 2006-012185 filed in Japan on Jan. 20, 2006 under U.S.C. §119. The entire contents of each of the above-identified applications are hereby incorporated by reference.

BACKGROUND OF THE INVENTION

The present invention relates to a rolling bearing device for vehicles used for, for example, an anti-lock brake system (ABS).

On a motor vehicle mounted with an anti-lock brake system (ABS), there is often used a rolling bearing device for vehicles in which a magnetic sensor is attached to a roller bearing rotatably supporting a driven wheel. The rolling bearing device for vehicles is mounted with a cover to protect a ring-shaped magnetized element (magnetized pulser ring) arranged so as to face to the magnetic sensor and to prevent muddy water from adhering to the magnetized pulser ring. As this cover, a nonmagnetic material is used so that the magnetized pulser ring can be protected and a change in magnetism of the magnetized pulser ring can be detected with high accuracy (refer to Japanese Patent Laid-Open No. 2004-198378).

A problem with the conventional rolling bearing device for vehicles is that even if a nonmagnetic material is used as the cover, the cover is magnetized when being pressed, and the residual magnetism exerts an adverse influence on the output waveform of magnetic sensor with respect to the change in magnetism of the magnetized pulser ring, resulting in the degradation in detection accuracy of magnetic sensor.

SUMMARY OF THE INVENTION

The present invention has been made in view of the above circumstances, and accordingly an object thereof is to provide a rolling bearing device for vehicles capable of detecting a change in magnetism with high accuracy.

The present invention provides a rolling bearing device for vehicles including a rolling bearing having an inner ring and an outer ring and rolling elements interposed between both of the races; a magnetized element disposed on one side in the axial direction of the inner ring; and a cover attached to the outer ring so as to cover the magnetized element, characterized in that the cover is formed by demagnetizing a nonmagnetic metallic material.

According to the above-described configuration, even if the cover is magnetized by pressing though the cover is formed of a nonmagnetic metallic material, demagnetization can effectively restrain an adverse influence exerted on the waveform of magnetic sensor by a magnetized cover. Therefore, the accuracy of detection of the change in magnetism of the magnetized pulser ring is increased.

In the above-described rolling bearing device for vehicles, the residual magnetism after demagnetization of the cover is preferably not higher than 3 gausses, further preferably not higher than 1 gauss. In this case, the influence on the magnetic sensor is especially reduced, so that the change in magnetism can be detected with higher accuracy.

According to the present invention, since the cover is formed by demagnetizing a nonmagnetic material having been pressed, a rolling bearing device for vehicles capable of detecting a change in magnetism of the magnetized pulser ring with high accuracy can be provided.

BRIEF DESCRIPTION OF THE DRAWINGS

FIG. 1 is a sectional view of a rolling bearing device for vehicles in accordance with one embodiment of the present invention.

DETAILED DESCRIPTION

A preferred embodiment of the present invention will now be described with reference to the accompanying drawing.

FIG. 1 is a sectional view of a rolling bearing device for vehicles in accordance with the present invention.

A rolling bearing device H for vehicles in accordance with this embodiment, which is disposed on the driven wheel side of motor vehicle, includes a double-row angular ball bearing 13 serving as a rolling bearing having an inner ring 11, which is a rotating ring, and an outer ring 12, which is a fixed ring, and rolling elements 3 and 4 interposed between the races 11 and 12, a ring-shaped magnetized element (magnetized pulser ring) 14 disposed on one side in the axial direction of the inner ring 11 (the inboard side, the right-hand side in FIG. 1), a magnetic sensor 15 arranged so as to face to the magnetized element 14, and a cover 16 attached to the outer ring 12 to seal the opposed portion between the magnetized element 14 and the magnetic sensor 15.

The double-row angular ball bearing 13 includes a first inner ring member 1 arranged on the other side in the axial direction (the outboard side, left-hand side in FIG. 1), a second inner ring member 2 arranged on one side in the axial direction (the inboard side) of the first inner ring member 1, the outer ring 12 mounted on the outside of the first and second inner ring members 1 and 2, the balls 3 and 4 serving as rolling elements that are interposed between the first and second inner ring members 1 and 2 and the outer ring 12 and arranged in two rows in the axial direction, crown-shaped cages 17 and 18 holding the balls 3 and 4, and a seal member 19 for sealing a space formed by the first and second inner ring members 1 and 2 and the outer ring 12.

Specifically, the first inner ring member 1 has a flange portion 1a provided so as to extend toward the outside in the radial direction on the other side in the axial direction (the outboard side) of the first inner ring member 1 and a column portion 1b formed into a substantially columnar shape extending from the root portion of the flange portion 1a toward one side in the axial direction (the inboard side), and further has a first raceway portion 1c in the vicinity of the root portion of the flange portion 1a and a small-diameter shank portion 1d formed on one side in the axial direction (the inboard side) of the column portion 1b. Further, a calking portion 1f is formed in the end portion on one side in the axial direction of the small-diameter shank portion 1d.

The second inner ring member 2 is attached in a state of being mounted on the outside of the small-diameter shank portion 1d of the first inner ring member 1. In the initial state, the calking portion 1f of the first inner ring member 1 is formed into a cylindrical shape having the same diameter as that of the small-diameter shank portion 1d. The end portion on one side in the axial direction of the cylindrical calking portion 1f is bent outward in the radial direction, and is brought into contact with the end surface on one side in the axial direction of the second inner ring member 2, by which the second inner ring member 2 is fixed so as not to move in the axial direction with respect to the first inner ring member 1. Also, the second inner ring member 2 has a second raceway portion 2a on the outer peripheral surface thereof.

In the flange portion 1a of the first inner ring member 1, a plurality of through holes (holes for fastening) 1e are formed so that the rolling bearing device can be fastened to a wheel (not shown) by causing fastening members B such as bolts to pass through the through holes (holes for fastening) 1e.

On the other hand, the outer ring 12 has a first raceway portion 12b and a second raceway portion 12c on the inner peripheral surface thereof, and also has a flange portion 12a provided so as to extend outward in the radial direction.

The flange portion 12a is fastened to a steering knuckle (suspension system) of the vehicle body so that the outer ring 12 is a fixed ring. In this embodiment, the double-row angular ball bearing 13 in which the balls 3 and 4 are arranged in two rows in the axial direction is used. However, the present invention is not limited to this configuration, and it is a matter of course that another ball bearing or roller bearing may be used.

The magnetized pulser ring 14 is affixedly attached to a support member 20 on one side in the axial direction (the inboard side) of the second inner ring member 2, the support member 20 being formed by a metallic member having a substantially L-shaped cross section. The support member 20 is located from the second raceway portion 2a to the inboard side, and is attached to the outer peripheral surface of a shoulder portion formed in the end portion on one side of the inner ring member 2.

The magnetized pulser ring 14 is used to detect the number of revolutions of the inner ring 11 (the first inner ring member 1 and the second inner ring member 2), which is a rotating ring, and has a configuration such that unlike poles (N poles and S poles) are magnetized alternately in the circumferential direction by using magnets, rubber magnets in which magnetic particles are mixed with a magnet or elastomer, plastic magnets in which magnetic particles are mixed with a resin, and the like. By the above-described configuration, a change in magnetism can be detected by the magnetic sensor (for example, a magnetic sensor having a magnetoresistive element) 15 facing to the magnetized pulser ring 14 via the cover 16, and therefore the number of revolutions of the inner ring 11 can be determined by the detection result.

The cover 16 protects the magnetized pulser ring 14 attached to the outer ring 12, which is a fixed ring.

The cover 16 is integrally provided with an outer periphery cylindrical portion 16a fixed to the outer peripheral edge portion by being press fitted on the inner peripheral surface of the outer ring 12, a ring-shaped flat portion 16b facing to the magnetized pulser ring 14, and a bottom surface portion 16c covering the shank end portion of the small-diameter shank portion 1d. These portions 16a to 16c are formed by pressing one metal sheet.

The cover 16 is formed into a predetermined shape by pressing a nonmagnetic metallic material such as nonmagnetic stainless steel (for example SUS 304), aluminum, copper, or brass, and then is subjected to demagnetization (for example, the AC demagnetizing process or the thermal demagnetizing process) so that the residual magnetism is preferably not greater than 3 gausses. The residual magnetism is preferably lower, especially 1 gauss or lower being preferable. That is to say, the magnetism acquired when the nonmagnetic material is pressed is removed by demagnetization so as not to exert an adverse influence on the change in magnetism of the magnetized pulser ring 14. The residual magnetism can be measured by a gauss meter using a Hall element.

Herein, demagnetization is to remove magnetic force/properties from a magnetized object such as a magnet, and there are two kinds of demagnetizing processes: the AC demagnetizing process and the thermal demagnetizing process. Although both of the processes provide a certain demagnetization effect, in the AC demagnetizing process, for a material having a high coercive force, magnetic energy remains though the quantity thereof is small. Therefore, if complete demagnetization is desired, the thermal demagnetizing process is effective.

The thermal demagnetizing process is a process in which a magnetized object is heated to a temperature not lower than the Curie point (temperature), and is restored again to the original condition. The hysteresis loop due to demagnetization increases gradually, and when the peak is reached, it decreases gradually, finally the magnetic force becoming zero.

Although the thermal demagnetizing process achieves a higher demagnetization effect than the AC demagnetizing process, in the thermal demagnetizing process, the cover 16 may be deformed by heating, so that a step for rectifying the deformation is required after the demagnetizing process. Therefore, the use of the AC demagnetizing process can raise the productivity.

In the rolling bearing device H for vehicles in accordance with this embodiment, which is configured as described above, since the cover 16, which is magnetized acquiring magnetism due to pressing is subjected to demagnetization, an adverse influence exerted on the output waveform of the magnetic sensor 15 can be restrained effectively.

Specifically, the magnetic sensor 15 is provided to detect a change in magnetism caused by the magnetized pulser ring 14, and if the magnetized cover 16 is used, the magnetic sensor 15 also detects the magnetism of the cover 16, which degrades the accuracy of detection of the change in magnetism of the magnetized pulser ring 14.

Therefore, the cover 16 made of a nonmagnetic material is used. However, if the cover 16 is pressed in manufacturing, the cover 16 acquires magnetism. In the present invention, the residual magnetism is reduced by demagnetizing the cover 16 after pressing. Therefore, the rolling bearing device H for vehicles which is capable of detecting a change in magnetism of the magnetized pulser ring 14 with high accuracy can be obtained.

The cover 16 in accordance with the present invention may be formed with a through hole (not shown) in the central portion of the bottom surface portion 16c. In this case, a driving shaft inserted through the through hole in the bottom surface portion 16c is connected to the inner ring 11 to transmit the rotation, by which the rolling bearing device of the present invention can also be used for driving the wheel.

The present invention is not limited to the above-described embodiment, and it is a matter of course that an appropriate design change can be made.

What is claimed is:

1. A method for manufacturing a rolling bearing device for vehicles, comprising:
    providing a rolling bearing having an inner ring and an outer ring and a rolling element interposed between two races;
    disposing a magnetized element on one side in the axial direction of the inner ring;
    forming a pressed cover by pressing a metallic material of one of austenitic stainless steel, aluminum, copper and brass;

demagnetizing the pressed cover, thereby removing magnetism that is acquired by pressing the metallic material; and attaching the pressed cover to the outer ring so as to cover the magnetized element.

2. The method according to claim 1, wherein the step of demagnetizing the pressed cover includes demagnetizing the pressed cover until the residual magnetism of the pressed cover is not higher than 3 gausses.

3. The method according to claim 1, wherein the step of demagnetizing the pressed cover includes demagnetizing the pressed cover until the residual magnetism of the pressed cover is not higher than 1 gauss.

4. The method according to claim 1, wherein the step of demagnetizing the pressed cover is accomplished by an AC demagnetizing process.

5. The method according to claim 1, wherein the step of demagnetizing the pressed cover is accomplished by a thermal demagnetizing process.

6. The method according to claim 1, further comprising forming the magnetized element by forming opposite magnetic poles alternately in the circumferential direction on a rubber magnet in which magnetic particles are mixed with an elastomer.

7. A method for manufacturing a rolling bearing device for vehicles, comprising:
   attaching an outer ring member to a vehicle body side;
   providing an inner ring member provided with a first inner ring having a flange portion for attaching a wheel and a column portion and a second inner ring attached to a small-diameter shank portion formed in an end portion on one side of the column portion;
   providing double-row rolling elements arranged between first and second outer ring raceway surfaces formed in rows in the axial direction on the inner peripheral surface of the outer ring member and first and second inner ring raceway surfaces formed on an outer peripheral surface of the column portion of the first inner ring and the outer peripheral surface of the second inner ring;
   providing a magnetized pulser ring provided with a support member attached to the outer peripheral surface of a shoulder portion formed in an end portion on one side of the inner ring and a pulser formed of a magnetic material attached to a side surface on one side of the support member and magnetized so as to have opposite magnetic poles alternately in the circumferential direction;
   forming a pressed cover by pressing a metallic material of one of austenitic stainless steel, aluminum, copper and brass;
   demagnetizing the pressed cover, thereby removing magnetism that is acquired by pressing the metallic material; and
   attaching the pressed cover to an end portion on one side of the outer ring so as to cover the magnetized pulser ring and formed of a demagnetized pressed metallic material.

8. The method according to claim 7, wherein the step of demagnetizing the pressed cover includes demagnetizing the pressed cover until the residual magnetism of the pressed cover is not higher than 3 gausses.

9. The method according to claim 7, wherein the step of demagnetizing the pressed cover includes demagnetizing the pressed cover until the residual magnetism of the pressed cover is not higher than 1 gauss.

10. The method according to claim 7, wherein the step of demagnetizing the pressed cover is accomplished by an AC demagnetizing process.

11. The method according to claim 7, wherein the step of demagnetizing the pressed cover is accomplished by a thermal demagnetizing process.

* * * * *